(12) United States Patent
Fukui (10) Patent No.: US 7,757,209 B2
(45) Date of Patent: Jul. 13, 2010

(54) DISPLAY AND EDIT DEVICE, DISPLAY METHOD AND PROGRAM PRODUCT

(75) Inventor: Shinji Fukui, Mishima (JP)

(73) Assignee: OMRON Corporation, Kyoto (JP)

( * ) Notice: Subject to any disclaimer, the term of this patent is extended or adjusted under 35 U.S.C. 154(b) by 1050 days.

(21) Appl. No.: 10/799,448

(22) Filed: Mar. 12, 2004

(65) Prior Publication Data

US 2004/0220684 A1 Nov. 4, 2004

(30) Foreign Application Priority Data

Mar. 14, 2003 (JP) ............................. 2003-069400
Mar. 4, 2004 (JP) ............................. 2004-060828

(51) Int. Cl.
G06F 9/44 (2006.01)
G06F 3/038 (2006.01)
G05B 11/01 (2006.01)

(52) U.S. Cl. ..................... 717/113; 717/110; 717/105; 717/109; 700/18; 715/771; 715/961; 715/970

(58) Field of Classification Search ................ 717/105, 717/113
See application file for complete search history.

(56) References Cited

U.S. PATENT DOCUMENTS

| | | | | |
|---|---|---|---|---|
| 5,267,145 A | * | 11/1993 | Zifferer et al. ................. | 700/86 |
| 5,777,869 A | * | 7/1998 | Welch ........................... | 700/18 |
| 5,781,776 A | * | 7/1998 | Johnston et al. ............. | 717/130 |
| 5,801,942 A | * | 9/1998 | Nixon et al. .................... | 700/83 |
| 5,828,851 A | * | 10/1998 | Nixon et al. .................. | 710/105 |
| 5,838,563 A | * | 11/1998 | Dove et al. ..................... | 700/83 |
| 5,909,368 A | * | 6/1999 | Nixon et al. ..................... | 700/2 |
| 5,980,078 A | * | 11/1999 | Krivoshein et al. ............. | 700/1 |
| 5,980,096 A | * | 11/1999 | Thalhammer-Reyero ........... | 1/1 |
| 5,995,916 A | * | 11/1999 | Nixon et al. ................. | 702/182 |
| 6,032,208 A | * | 2/2000 | Nixon et al. ................... | 710/64 |
| 6,088,665 A | * | 7/2000 | Burns et al. ................. | 702/188 |
| 6,161,051 A | * | 12/2000 | Hafemann et al. ............ | 700/86 |

(Continued)

FOREIGN PATENT DOCUMENTS

GB 2345360 7/2000

(Continued)

OTHER PUBLICATIONS

"Siemens Ladder Logic (LAD) for S7-300 and S7-400 Programming Manual", 1996, Siemens AG, 1-318.*

(Continued)

*Primary Examiner*—Tuan Q Dam
*Assistant Examiner*—Marina Lee
(74) *Attorney, Agent, or Firm*—Weaver Austin Villeneuve & Sampson LLP (57) ABSTRACT

A display and edit device for a program containing function blocks has a program memory storing such a program to be processed, a block definition analyzer for accessing the program stored in the program memory and analyzing structure relationship of function block definitions contained in this program, a block instance analyzer for accessing this program stored in the program memory and analyzing structure relationship of function block instances contained in this program, and a structure display device for causing to display structure relationship of the analyzed structure relationship of this function block definition and structure relationship of the analyzed structure relationship of this function block instance.

9 Claims, 11 Drawing Sheets

U.S. PATENT DOCUMENTS

| | | | | |
|---|---|---|---|---|
| 6,233,703 | B1* | 5/2001 | Powers | 714/48 |
| 6,268,853 | B1* | 7/2001 | Hoskins et al. | 700/83 |
| 6,282,701 | B1* | 8/2001 | Wygodny et al. | 717/125 |
| RE37,722 | E* | 5/2002 | Burnard et al. | 713/1 |
| 6,425,120 | B1* | 7/2002 | Morganelli et al. | 717/109 |
| 6,434,737 | B1* | 8/2002 | Nishi et al. | 717/105 |
| 6,437,805 | B1* | 8/2002 | Sojoodi et al. | 715/763 |
| 6,449,624 | B1* | 9/2002 | Hammack et al. | 1/1 |
| 6,618,856 | B2* | 9/2003 | Coburn et al. | 717/135 |
| 6,754,885 | B1* | 6/2004 | Dardinski et al. | 717/113 |
| 6,854,111 | B1* | 2/2005 | Havner et al. | 717/163 |
| 6,868,538 | B1* | 3/2005 | Nixon et al. | 717/100 |
| 6,931,288 | B1* | 8/2005 | Lee et al. | 700/86 |
| 7,042,469 | B2* | 5/2006 | Fuller | 345/629 |
| 7,043,311 | B2* | 5/2006 | Nixon et al. | 700/83 |
| 7,062,422 | B2* | 6/2006 | Inoko et al. | 703/13 |
| 7,062,718 | B2* | 6/2006 | Kodosky et al. | 715/771 |
| 7,110,837 | B2* | 9/2006 | Oka et al. | 700/87 |
| 7,210,117 | B2* | 4/2007 | Kudukoli et al. | 717/100 |
| 7,219,306 | B2* | 5/2007 | Kodosky et al. | 715/763 |
| 7,272,458 | B2* | 9/2007 | Tomita | 700/87 |
| 7,272,815 | B1* | 9/2007 | Eldridge et al. | 717/101 |
| 7,330,767 | B2* | 2/2008 | Thiele et al. | 700/29 |
| 7,356,774 | B2* | 4/2008 | Shah et al. | 715/771 |
| 7,451,403 | B1* | 11/2008 | Srinivasan et al. | 715/763 |
| 7,515,972 | B2* | 4/2009 | Kumar et al. | 700/17 |
| 7,526,347 | B2* | 4/2009 | Lucas et al. | 700/79 |
| RE40,817 | E* | 6/2009 | Krivoshein et al. | 700/1 |
| 7,599,748 | B2* | 10/2009 | Dove et al. | 700/17 |
| 2002/0013629 | A1* | 1/2002 | Nixon et al. | 700/4 |
| 2002/0040286 | A1* | 4/2002 | Inoko et al. | 703/13 |
| 2002/0059282 | A1* | 5/2002 | Andersson et al. | 707/100 |
| 2002/0120921 | A1* | 8/2002 | Coburn et al. | 717/140 |
| 2003/0034998 | A1* | 2/2003 | Kodosky et al. | 345/736 |
| 2003/0088854 | A1* | 5/2003 | Wygodny et al. | 717/130 |
| 2003/0225469 | A1* | 12/2003 | DeRemer et al. | 700/96 |
| 2004/0019875 | A1* | 1/2004 | Welch | 717/109 |
| 2004/0117766 | A1* | 6/2004 | Mehta et al. | 717/121 |
| 2004/0194101 | A1* | 9/2004 | Glanzer et al. | 718/100 |
| 2004/0199925 | A1* | 10/2004 | Nixon et al. | 719/315 |
| 2004/0220684 | A1* | 11/2004 | Fukui | 700/18 |
| 2006/0206217 | A1* | 9/2006 | Fujii | 700/18 |
| 2007/0078538 | A1* | 4/2007 | Kawakami et al. | 700/87 |
| 2009/0007000 | A1* | 1/2009 | Hasegawa et al. | 715/772 |

FOREIGN PATENT DOCUMENTS

| | | |
|---|---|---|
| JP | 64-500229 | 1/1989 |
| JP | 2000-112737 | 4/2000 |
| JP | 2001-242906 | 9/2001 |
| JP | 2001-522077 | 11/2001 |

OTHER PUBLICATIONS

"Function Block/Structured Text Introduction Guide", @2007 OMRON Electronics LLC, retrieved from <http://www.omron247.com/marcom/pdfcatal.nsf/83F7C01E896CDA8D86256FD6005F28D1/$FILE/M03R1441107.pdf>, total pages: 93.*

"Ladder Logic Editor Compiler Simulator", @ 1989-1999 by Triangle Reasearch International PTE Ltd, Singapor ("TRi"), retrieved from <http://www.tri-plc.com/trilogi.pdf>, total pages: 78.*

Patent Abstracts of Japan, Publication No. 09-212213, *Monitor Tool For Integrating Programmable Controller System*, Iwasaki Akiko et al., published Aug. 15, 1997.

Japan patent application No. 2004-060828, Examination Report dated Aug. 22, 2006.

EP patent application No. 04005650.9-1239, Search Report dated Sep. 24, 2007.

* cited by examiner

DISPLAY AND EDIT DEVICE, DISPLAY METHOD AND PROGRAM PRODUCT

BACKGROUND OF THE INVENTION

This invention relates to a display and edit device, a display method and a program product and is more in particular in the technical field of carrying out a specified process on a program including function blocks by outputting data related to these blocks.

Programmable logic controllers (PLC) installed at a production site to be in charge of a factory automation system are usually adapted to carry out cyclic operations of processes such as taking signals inputted through an input unit into an I/O memory of a CPU unit ("IN-refresh"), carrying out calculations based on a user program preliminarily registered in a ladder diagram ("calculation"), writing the results of such calculation in the I/O memory to transmit them to an output unit ("OUT-refresh") and thereafter carrying out a so-called peripheral service process.

The aforementioned user program is usually created by a ladder program capable of using function blocks established according to JIS B3503 (1997). Input and output parameters, internal variables and operations (algorithms) of the function block are established by using a language element called function block definition. When a function block is incorporated in a user program, copies referred to as function block instances are created by instantiating (or invoking) this function block definition and such function block instances are written in a ladder program. Thus, when instances based on the same function block definition are used at a plurality of locations, each is instantiated such that a plurality of function block instances are created and incorporated at each of the localities within the program. Each function instance is given its unique instance name and identified uniquely on the basis of its instance name. A function block definition may be defined so as to call another function block definition in its algorithm.

In other words, one or more function block instances can be created from one function block definition. Zero or any specified number of other function blocks may be called from one function block definition.

Figure 1:
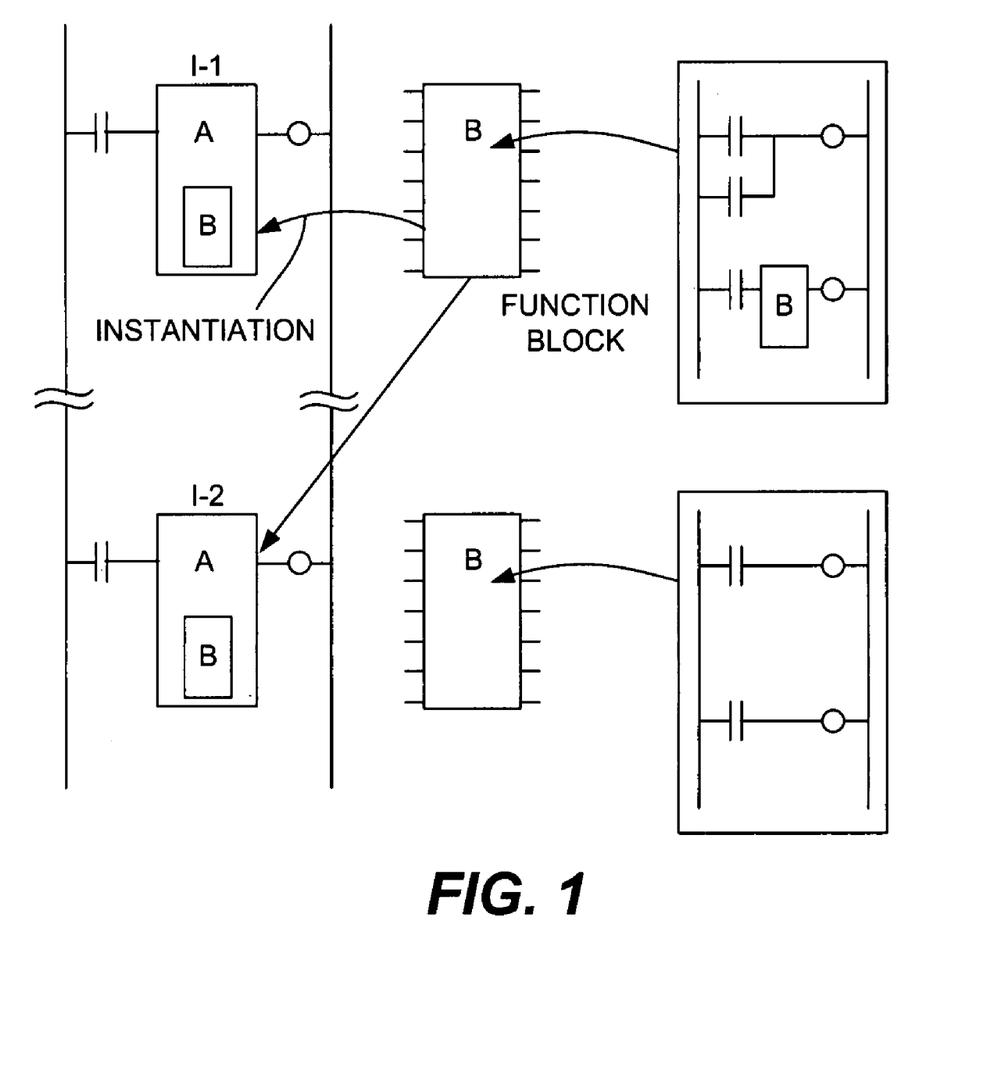
FIG. 1 is a diagram for showing the relationship between function block definitions and function block instances.

Function block definitions and functional block instances will be explained next by way of an example. Let us assume that function block definitions A and B are defined as shown in FIG. 1 which is a ladder diagram showing the content of the definitions of the algorithm of the function block definition. As can be seen from this definition, function block definition A is calling different function block definition B. When these function block definitions A are actually used in a user program, they are instantiated with into function block instances with instance names I-1 and I-2. Function block definitions B are also invoked although their instance names are not shown. FIG. 1 shows an example where two instances (copies) with instance names I-1 and I-2 are created from one function block definition A and one function block instance B is called from one function block instance A.

Figure 2:
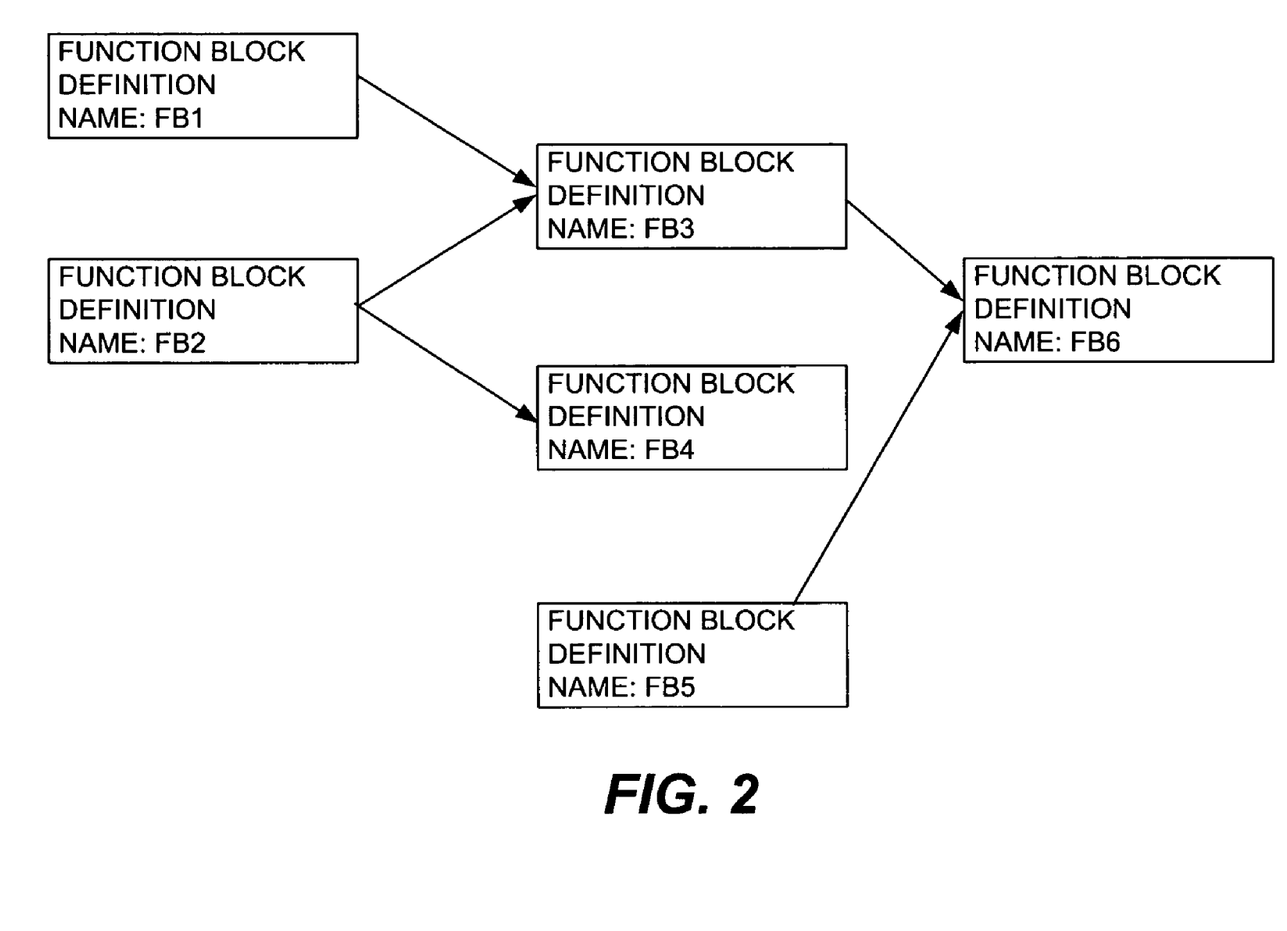
FIG. 2 is a diagram for showing an example of structure relationship of function block definition declarations.

Although this example has a simple structure of one function block definition A calling only one function block B definition, the actual structure may be different. FIG. 2 shows an example wherein function block definitions are called sequentially several times hierarchically such as function block definition FB3 which is called by function block definition FB1 further calling another function block definition FB6, another example wherein one function block definition (such as FB3) is called by a plurality of different function blocks (such as FB1 and FB2) and still another example wherein one function block definition (such as FB2) calls a plurality of function block definitions (such as FB3 and FB4).

When a program is actually created where one function block definition is called by a plurality of function block definitions as shown in FIG. 2, each function block is instantiated and the program will be of a structure of having a separate function block instance below each function block instance. Explained more in detail with reference to FIG. 3, two function block instances with instance names Inst1 and Inst2 are created as function block definitions FB1 and FB2 are instantiated. Instance name Inst1.FB3 created by invoking function block definition FB3 is connected below function block instance with instance name Inst1 and instance name Inst1.FB3.FB6 created by invoking function block FB6 is connected below function block instance with instance name Inst1.FB3. Instance names Inst2.FB3 and Inst2.FB4 are connected below function block instance with instance name Inst2, and instance name Inst2.FB3.FB6 is connected below instance name Inst2.FB3. In summary, the structure relationships of function block definition declarations and function block instances are different.

Figure 4:
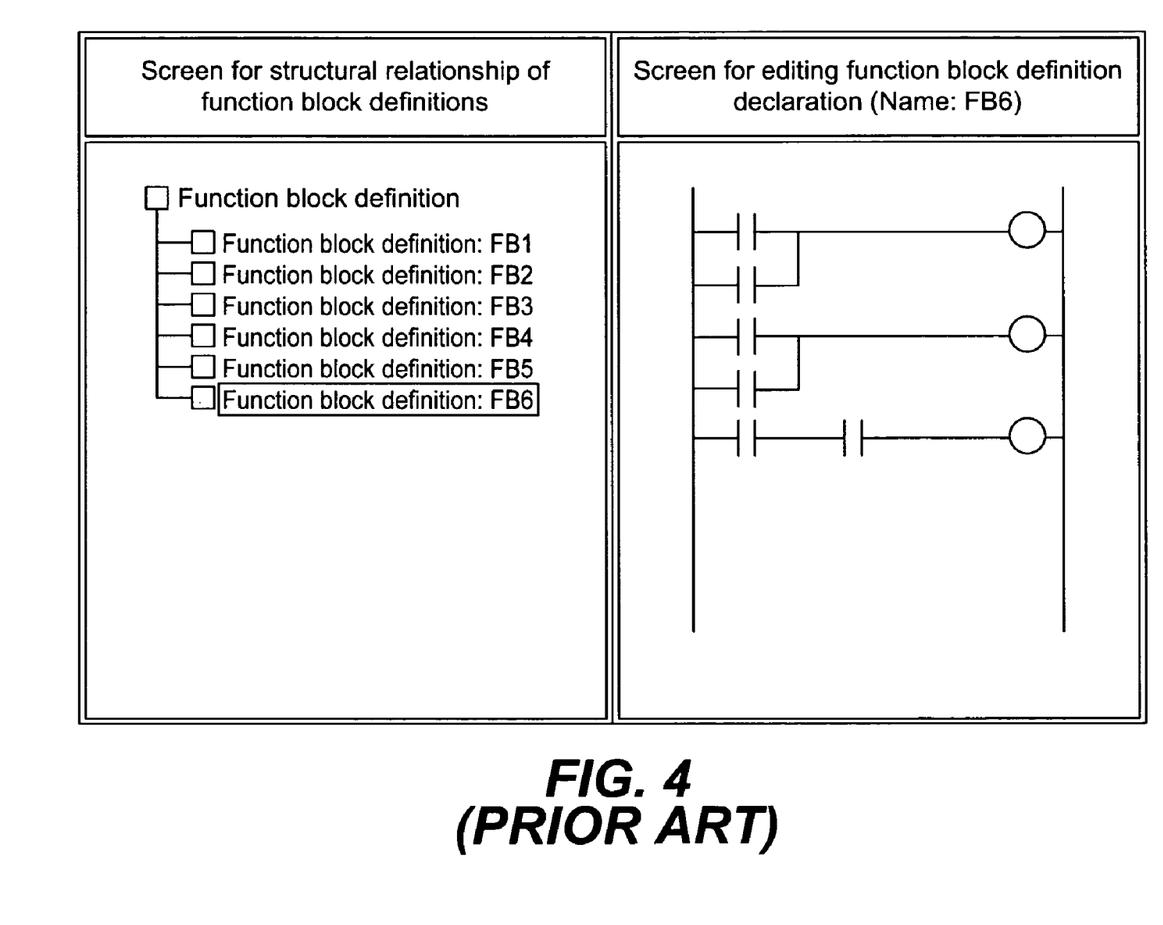
FIG. 4 is an example of prior art screen display of data related to function blocks.

Programming devices (or display and edit devices) for creating new programs and editing (or debugging) already created programs are adapted to display a program as it is examined and edited. FIG. 4 shows an example of a displayed function block, a list of function block definitions appearing on the left-hand side and a detailed definition of a selected function block definition on the right-hand side. In the example of FIG. 4, the content of definitions in the algorithm of the function block definition is displayed as a ladder diagram.

When the detailed content of definitions of a function block definition is displayed in the window on the right-hand side, it can be redefined by correcting the content of the definitions of the displayed function block definition and the corrected items are reflected on the function block instance. When the content of a function block instance is displayed, the content of the definitions cannot be corrected but the status of its operation can be monitored.

Japanese Patent Publication Tokkaihei 9-212213 has disclosed a monitor tool for a programmable controller system adapted to display a list on the left-hand side of the display screen and the contents of a selected one on the list on the right-hand side of the screen but this prior art system had problems as will be explained below.

Figure 3:
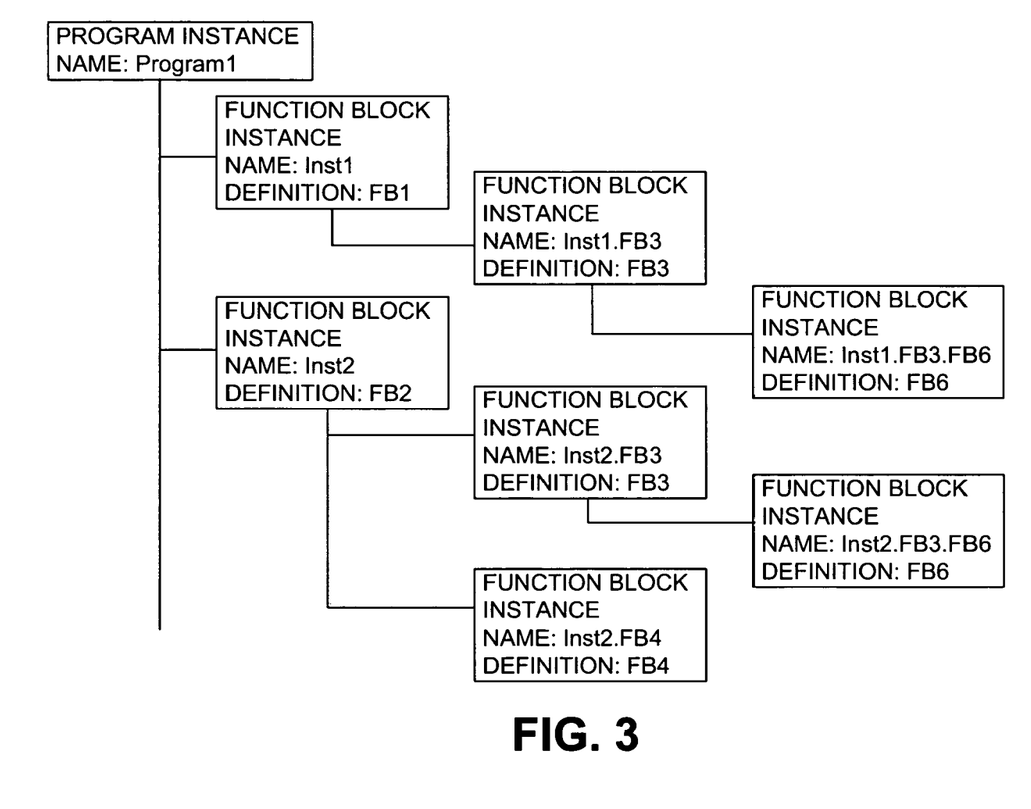
FIG. 3 is a diagram for showing an example of structure relationship of function block instances.

Firstly, since the list on the left-hand side of the display screen shows nothing but the function block definitions, the user can ascertain what kinds of function blocks are present but cannot easily understand the relationship of their connections. Since the structure relationship among function block definitions is different from that among function block instances where there is a function block that is calling another function block, as shown in FIGS. 2 and 3, it was difficult to understand their structure relationship.

Secondly, although the algorithm (the ladder diagram in the example of FIG. 4) displayed on the right-hand side of the display screen could be either a function block definition of a function block instance, the displayed ladder diagram was the same for both a function block definition and a function block instance. Thus, it was not easy to understand by a quick glance at the display whether what is being displayed is a function block definition or a function block instance.

Thirdly, when two or more function block instances are created from one function block definition and being used (such as FB3 and FB6 in the example of FIG. 3), although the function block instances are displayed on the programming device, it is difficult to distinguish which instance is being displayed.

Fourthly, when a programming device is being used to switch from one display screen of a program calling a certain function block to another display screen for the function block that is being called, both a function block definition and a function block instance can be an object of display but which is going to be displayed depends on the content of the process. In the prior art technology, the object of display was preliminarily determined (such as the function block definition). Thus, if the user wanted to have the function block instance displayed, the display screen had to be switched over and it was a cumbersome practice.

Fifthly, it was difficult while the algorithm of a function block instance is being displayed on the display screen to call the declaration of the function block definition from which the copy was made, say, for the purpose of editing.

SUMMARY OF THE INVENTION

It is therefore an object of this invention to provide a display and edit device, a display method and a program product with improved workability, making it possible to easily understand the structure relationships of function block definitions and function block instances, whether the algorithm, etc. on the display screen are displaying a function block definition of function block instance, and which of a plurality of function block instances based on a single function block definition is being displayed, and being capable of making a display (such as screen for editing a function block definition or for monitoring a function block instance) suitable for the current process and calling a related function block definition from a displayed function block definition.

The invention relates to a display and edit device for a program containing function blocks, characterized as comprising a program memory storing a program to be processed, a block definition analyzer for accessing the program stored in the program memory and analyzing structure relationship of function block definitions contained in this program, a block instance analyzer for accessing this program stored in the program memory and analyzing structure relationship of function block instances contained in this program, and a structure display device for causing to display structure relationship of the analyzed structure relationship of this function block definition and structure relationship of the analyzed structure relationship of this function block instance.

The invention also relates to a method of displaying a program including function blocks for a display and edit device, characterized as comprising the step of accessing the program stored in a program memory and analyzing structure relationship of function block definitions contained in this program, the step of accessing this program and analyzing structure relationship of function block instances contained in this program, and the step of displaying the analyzed structure relationship of functional block definitions and the analyzed structure relationship of functional block instances on a same display screen.

The invention further relates to a program product containing function blocks for display and editing by a display and edit device, characterized as comprising a first program portion for accessing a program containing function blocks and being stored in a program memory and analyzing structure relationship of function block definitions contained in this program, a second program portion for accessing this program and analyzing structure relationship of function block instances contained in this program, and a third program portion for displaying the analyzed structure relationship of functional block definitions and the analyzed structure relationship of functional block instances on a same display screen.

In the above, to display "on a same screen" means to cause two kinds of structure relationships to appear simultaneously on a same display and edit device. Thus, they may appear within a same window or on different windows. Since not only structure relationship of function block definitions but also that of function block instances is analyzed and displayed according to this invention, the user can take a simple look at such result of analysis to understand the structure relationship.

It is preferable to further provide the display and edit device of this invention with a display judging device for causing the structure display device to display with an emphasis the structure relationship of the selected function block definition or selected function block instance or a corresponding portion of the structure relationship of the function block instance. With the device thus provided, the user can easily understand whether contents of definitions such as an algorithm by a function block displayed on the display screen are based on a function block definition or a function block instance and, if there are a plurality of function block instances based on a same function block definition, which of the instances is being displayed.

It is further preferable to provide the display and edit device of this invention with a display selector that selectively determines, when a command to switch display is received, whether a function block definition or a function block instance should be displayed, based on current display and current conditions of processing by the display and edit device and causes the determined display to be made. With the device of the invention thus additionally provided, a suitable choice is made automatically between function block definition and function block instance to be displayed, depending on the processing condition at the time and hence workability of the device can be improved.

DETAILED DESCRIPTION OF THE INVENTION

Figure 5:
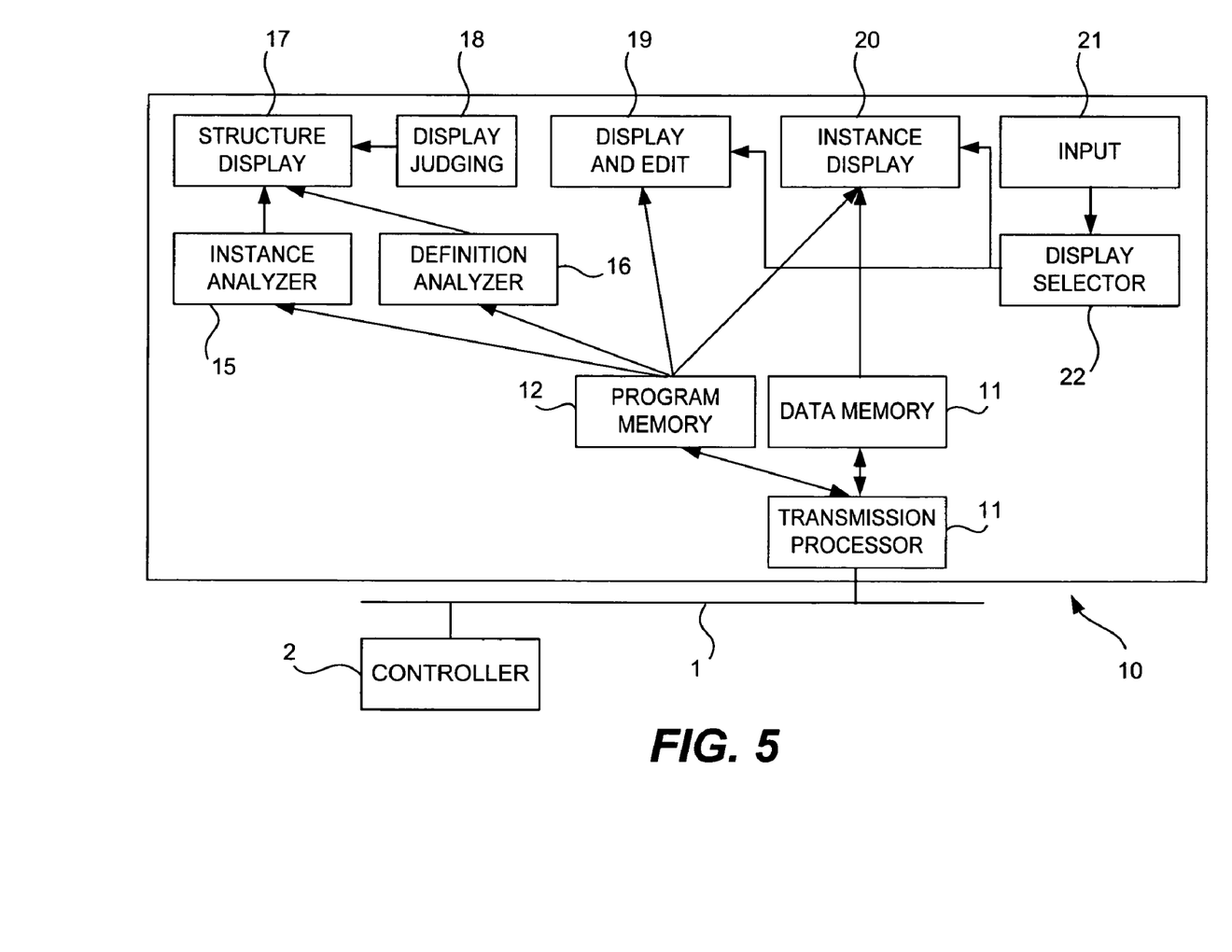
FIG. 5 is a block diagram of a system embodying this invention.

FIG. 5 shows the whole of a system embodying this invention, having a programming device 10 serving as a display and edit device connected through a network 1 to a controller 2 such as a PLC such that a user program may be downloaded to the controller 2, a user program stored in the controller 2 may be uploaded and data in the I/O memory of the controller 2 can be monitored.

The programming device 10 contains within itself a transmission processor 11 for transmitting and receiving data through the network 1 and a program memory 12 and a data memory 13 for temporarily storing programs and I/O data obtained through the transmission processor 11, respectively. The transmission processor 11 is adapted to access the controller 2 according to a specified communication protocol to read and write data and is basically of a conventional type. The program and data memories 12 and 13 may comprise a work memory such as a RAM.

Programs, which are temporarily stored in the program memory 12, are ladder programs containing function blocks. Such programs are called by a function block instance structure relationship analyzer ("instance analyzer") 15 and a function block definition structure relationship analyzer ("definition analyzer") 16 for analyzing the connection relation among the function blocks.

The instance analyzer 15 is for detecting a structure relationship of function block instances as shown in FIG. 3. Explained more in detail, a program temporarily stored in the program memory 12 is searched from its start and, when a function block instance is detected, its instance name is obtained and the algorithm of this function block instance is analyzed to judge the presence or absence of any function block instance being called. If there is a function block instance that is being called, this function block instance being called is connected below the original function block instance. Distinctions among function block instances are made by way of their instance names that are uniquely assigned.

If there is a function block instance that is being called, this function block instance being called is further analyzed to determine whether still another function block instance is being called thereby. This is continued, and when a function block instance that is not making any call is reached, a connection relation can be established among this series of function block instances.

As processes of this kind are repeated from the start of the program, the overall connection relationship of all function block instances within the program can be obtained. As shown in FIG. 3, data to be associated with each function block instance include the instance name and definition.

The definition analyzer 16 is for detecting a structure relationship of function block definitions as shown in FIG. 2. Explained more in detail, a program temporarily stored in the program memory 12 is searched from its start and, when a function block definition is detected, its definition name is obtained and the internal variables (internal circuits) of this function block definition are analyzed to judge the presence or absence of any function block definition being called. If there is a function block definition that is being called in the algorithm, this function block definition being called is connected below the original function block definition. If there is a function block definition that is being called, this function block definition being called is further analyzed to determine whether still another function block definition is being called thereby. This is continued, and when a function block definition that is not making any call is reached, a connection relationship can be established among this series of function block definitions.

As processes of this kind are repeated from the start of the program, the overall connection relationship of all function block definitions within the program can be obtained. In this case, unlike the analysis by the instance analyzer 15, there may a situation wherein a plurality of function block definitions are calling a same function block definition having the same definition name. Thus, the relationship may be of a tree-form with branching and joining as shown in FIG. 2.

Figure 6:
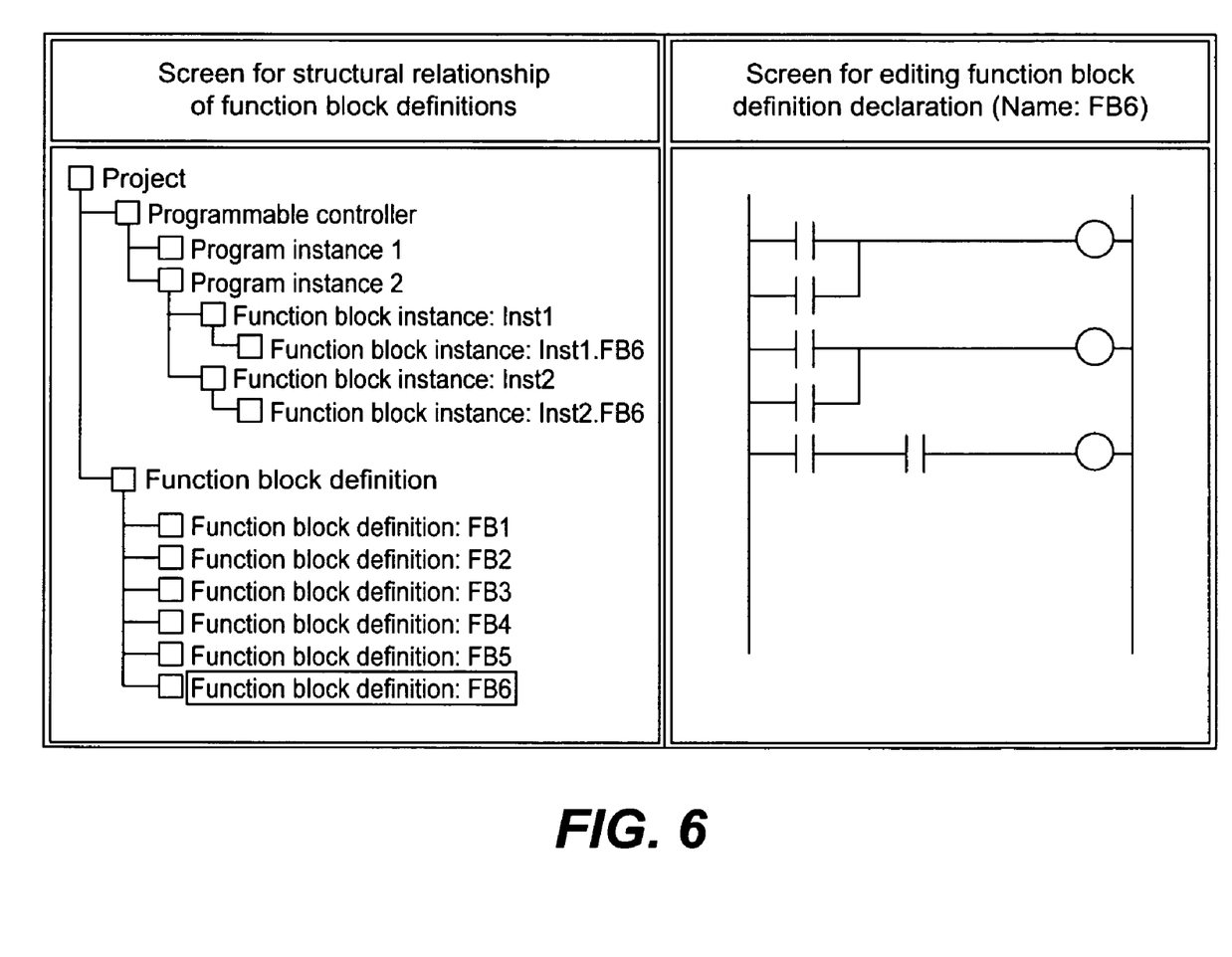
FIGS. 6 and 7 are each an example of display.
Figure 7:
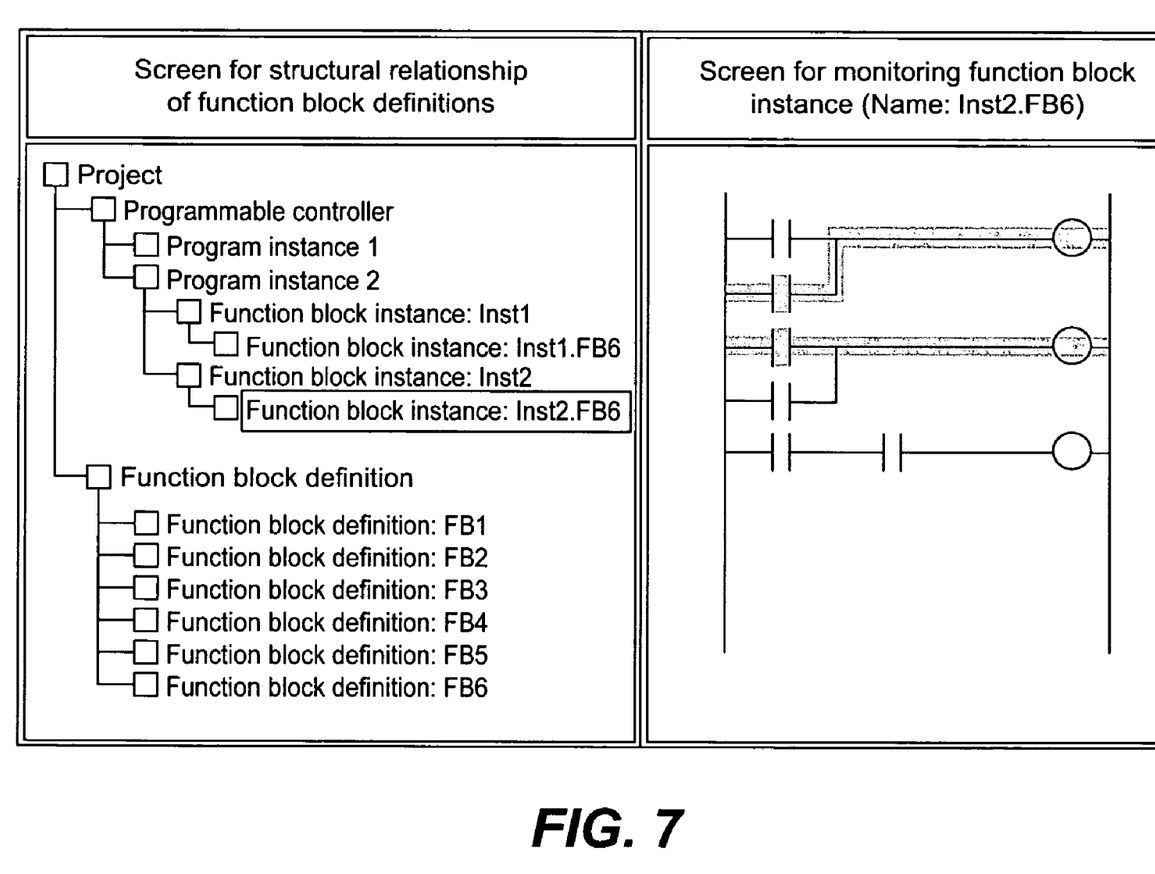

The structure relationships obtained by the instance analyzer 15 and the definition analyzer 16 are transmitted to a block structure display device 17 where they are displayed on a display screen each described in a tree-form. FIGS. 6 and 7 show examples of such a display.

Explained more in detail, the left-hand side of the display screen serves to display the structure relationship of function blocks and the left-hand side of the screen serves to display the algorithm (a ladder diagram in the examples of FIGS. 6 and 7) of the selected function block for monitoring and editing. Not only the structure relationship of function block definitions as before but also the tree-form of the structure relationship of function block instances is displayed in stages on the left-hand side. The display of the structure relationship may alternatively be made in the form shown in FIG. 2. If any of the function block definitions or function block instances displayed on the left-hand side is clicked upon through an input device (or a pointing device) 21, the algorithm of the selected function block definition or function block instance is displayed on the right-hand side.

Explained more in detail, if a function block definition is selected, a function block definition display and edit device 19 detects the input and reads out the corresponding function block definition from the program memory 12, displaying it as shown in FIG. 6 and thereby enabling the user to edit and redefine the internal circuits. This editing process is also carried out by the display and edit device 19 by following the commands provided through the input device 21, and the results of the editing process are stored in the program memory 12.

If a function block instance is selected, a block instance display device 20 detects the input and responds by reading out the corresponding function block instance from the program memory 12, obtaining I/O data from the data memory 13 and displaying the operating conditions of the algorithm of the function block instance based on the obtained I/O data as shown in FIG. 7. Since FIG. 7 shows the algorithm of the function block instance by a ladder diagram, its operating conditions are displayed by emphasizing a portion of such a ladder diagram. In this situation, a display judging device 18 ascertains which of the function block definitions or function block instances in the displayed structure relationship has been selected and transmits a command to the block structure display device 17 to display the selected portion with an emphasis. Upon receiving this command, the block structure display device 17 makes the requested display with an emphasis. Thus, the user has only to glance over the emphasized portion on the left-hand side of the display screen in order to ascertain whether it is a function block definition or a function block instance that is currently being displayed on the right-hand side of the display screen and, if it is a function block instance, which of the function block instances.

The input device 21 may be operated also for the purpose of switching the content of display, for example, for selecting a function block being called in another function block being displayed on the right-hand side of the screen. This is communicated to a display selector 22 which serves to determine whether it is better to display a function block definition or a function block instance. If it is judged that it is better to display a function block definition, this determination is communicated to the display and edit device 19, causing the corresponding function block definition to be read out and displayed. If it is judged that it is better to display a function block instance, this determination is communicated to the block instance display device 20, causing the corresponding function block instance to be read out and displayed.

Figure 8:
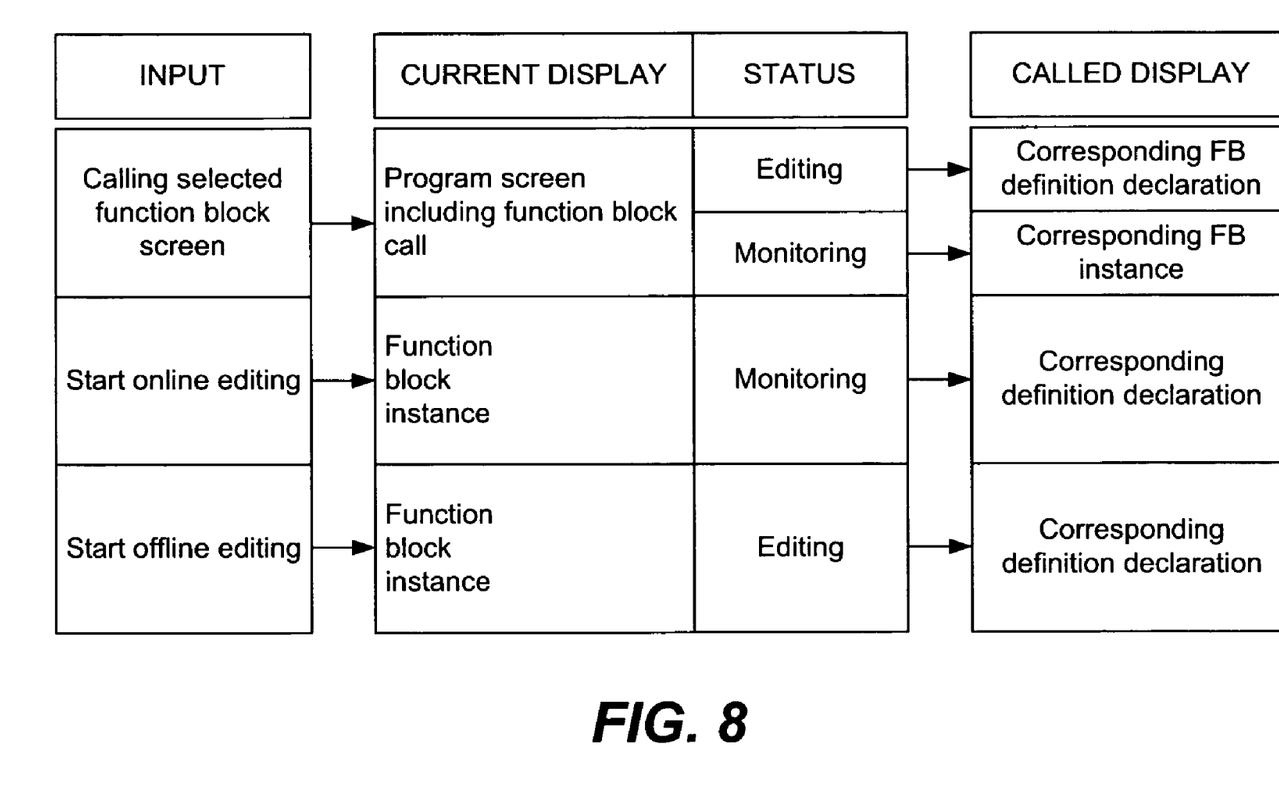
FIG. 8 is an example of a table that is referenced by the display selector.

Explained more in detail, the display selector 22 is provided with a table such as shown in Table 8. When it receives an operation input for a display change on the editing-monitoring screen, it determines what display should be made on the basis of the display which is currently being made and the current operation condition of the programming device 10 (such as editing a program or monitoring the operating condition of program being processed on the controller 2). Thus, the next display to be made is automatically determined on the basis of the current operating condition of the programming device 10. This improves the workability of the system.

Figure 9:
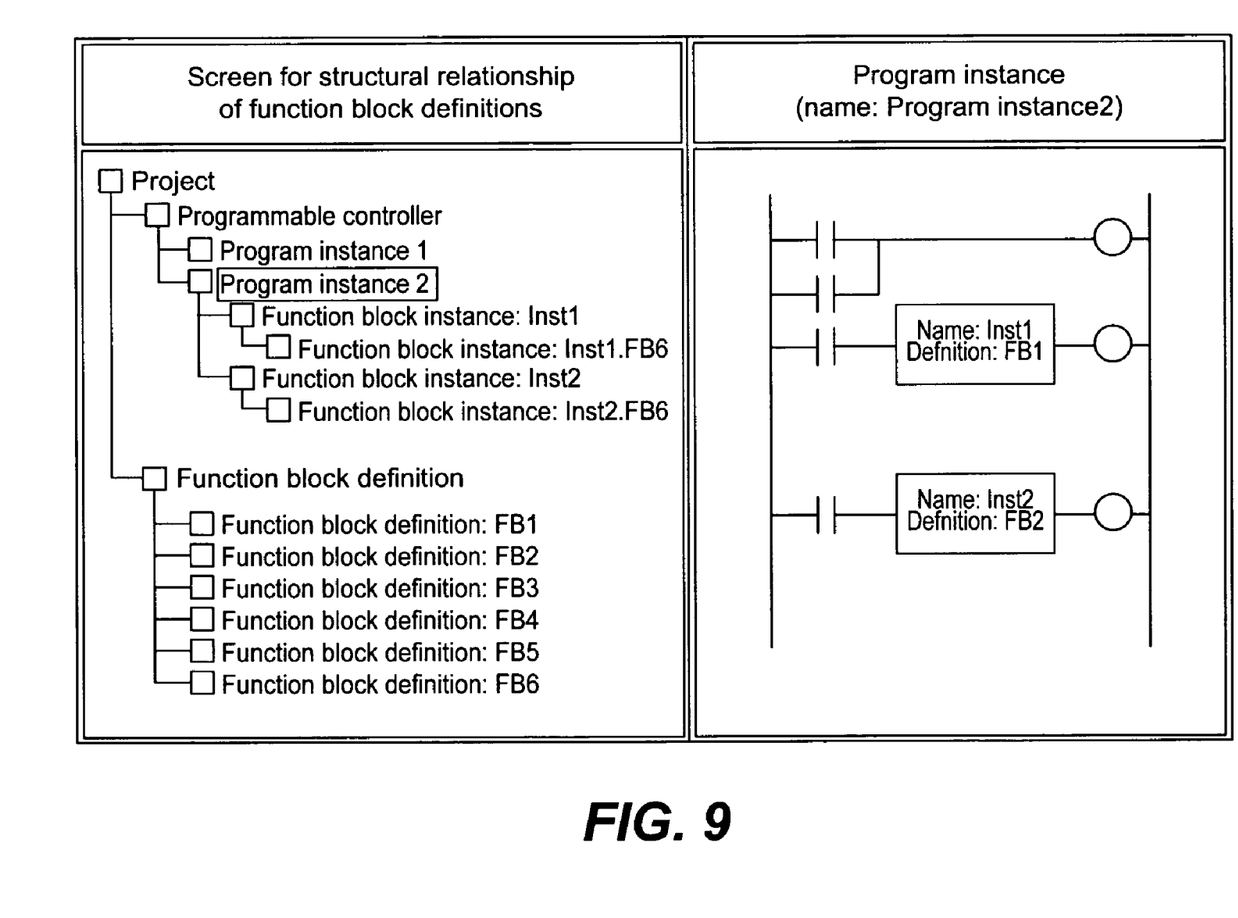
FIGS. 9, 10 and 11 are each an example of display for explaining the functions of the display selector.
Figure 10:
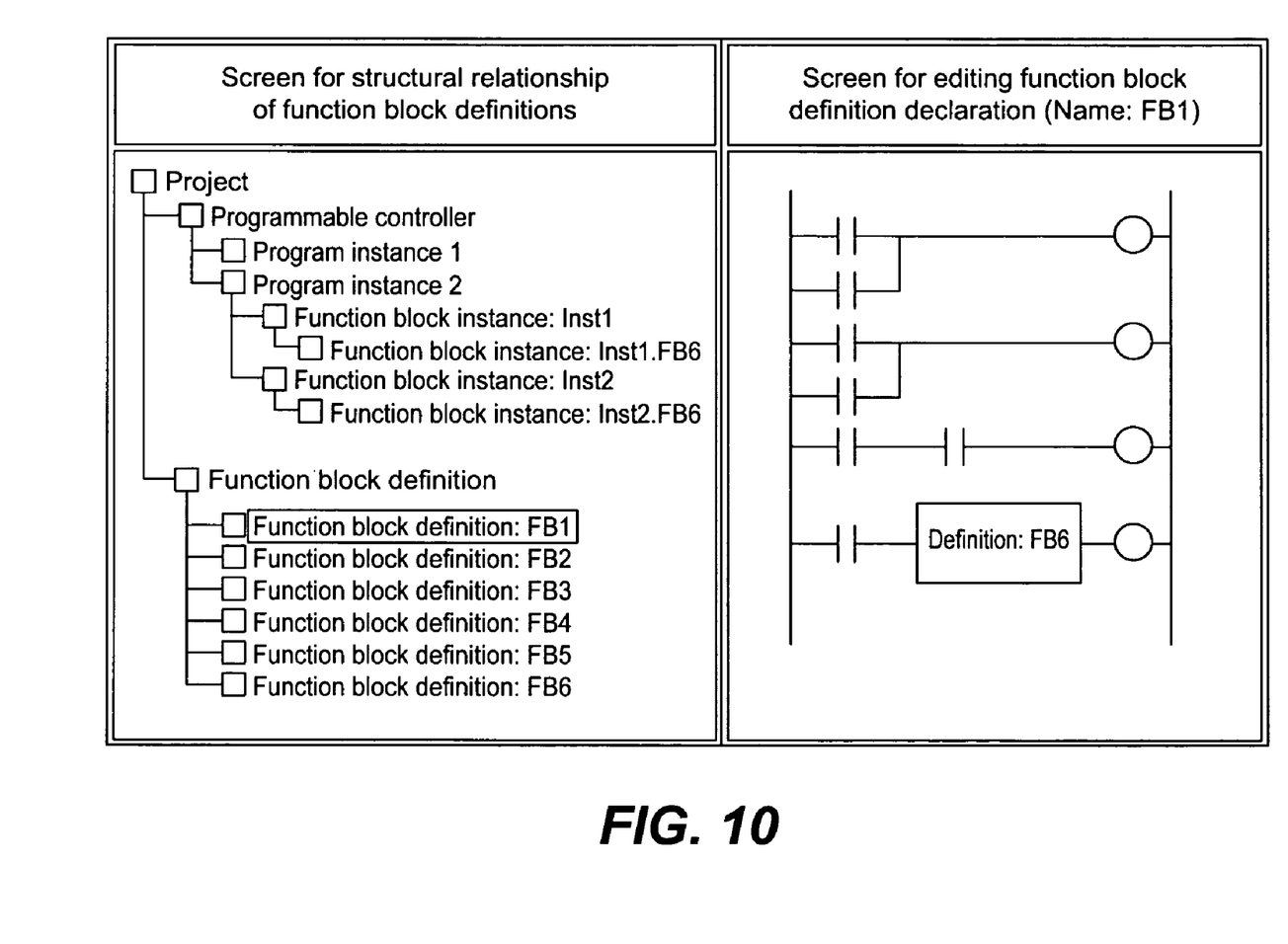
Figure 11:
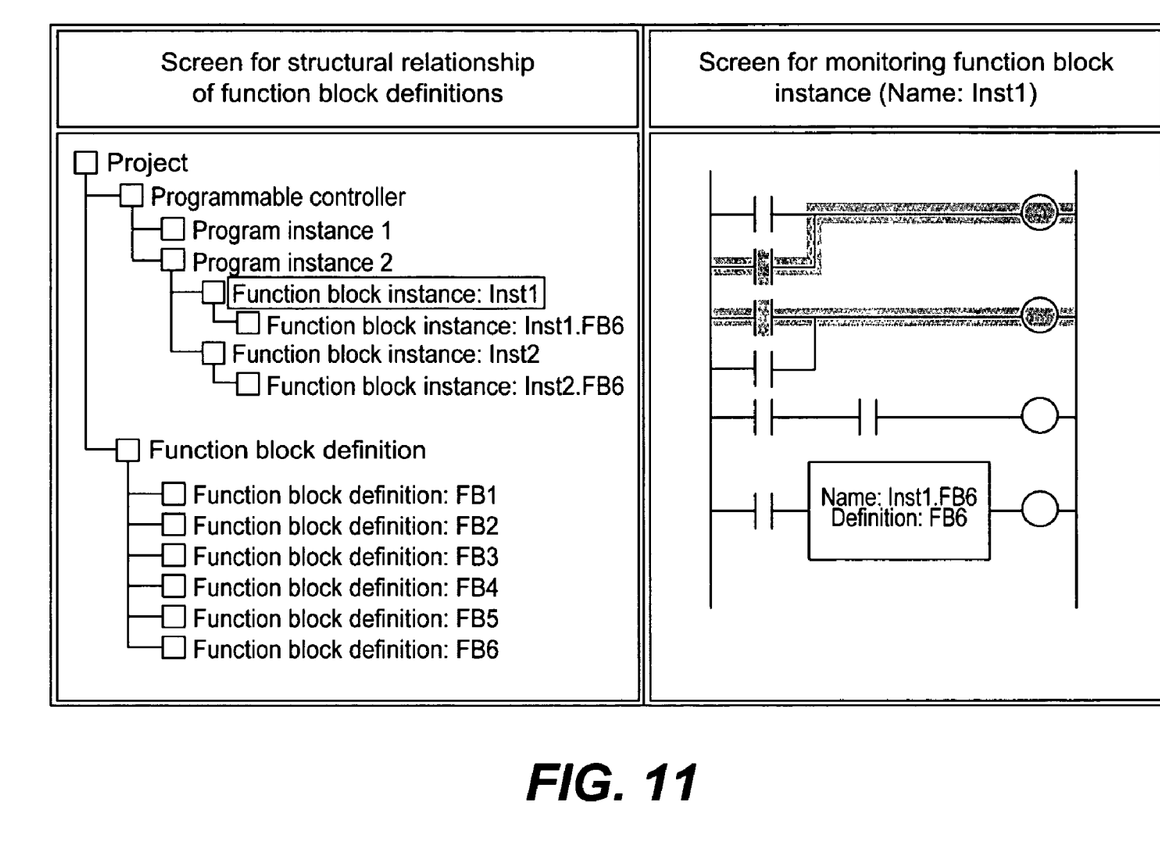

FIG. 9 shows, for example, a situation where a program with program name "program instance 2" is displayed on the right-hand side of the display screen. If one of the function blocks that is displayed (with instance name Inst1 and function block definition FB1, in this example) is selected, an edit screen of the function block definition declaration of function block definition FB1 (calling another function block definition FB6) is called as shown in FIG. 10 if the current operation condition of the programming device 10 is "editing" and a monitoring screen display of the corresponding function block instance with instance name Inst1 is called as shown in FIG. 11 if the current operation condition of the programming device 10 is "monitoring".

The processes described above may be carried out by an application program. Thus, although the invention was described above in terms of devices actually mounted to a computer or the like, this is not intended to limit the scope of the invention. These processes may be presented in the form of software (program product). Such program products may be distributed through different types of communication lines or in the form of a recording medium of any kind.

In summary, structure relationships of function block definitions and function block instances are each analyzed and their results are displayed according to this invention and hence the user can grasp their structure relationships easily at a first glance.

What is claimed is:

1. A display and edit device for a program containing function blocks, said function blocks serving to use a language element referred to as function block definitions to establish input and output parameters, internal variables and operations algorisms of the function block and to create copies referred to as function block instances by instantiating said function block definitions when said function block is incorporated in a user program, said device comprising:

a program memory storing said program;

a block definition analyzer for accessing said program stored in said program memory and analyzing structure relationship of function block definitions contained in said program;

a block instance analyzer for accessing said program stored in said program memory and analyzing structure relationship of function block instances contained in said program;

a structure display device for causing to simultaneously display structure relationship of the analyzed structure relationship of said function block definition and structure relationship of the analyzed structure relationship of said function block instance;

an instance display device for causing to display a selected function block definition or a selected function block instance together with said structure relationship of the analyzed structure relationship of said function block definition and said structure relationship of the analyzed structure relationship of said function block instance; and a display judging device for causing said structure display device to display with an emphasis the structure relationship of said selected function block definition or selected function block instance or a corresponding portion of the structure relationship of the function block instance;

wherein, when a function block included in said selected function block instance displayed by said instance display device is selected, said display judging device causes said structure display device to display with an emphasis said function block in the structure relationship of said selected function block instance; and wherein, when a function block included in said selected function block definition displayed by said instance display device is selected, said display judging device causes said structure display device to display with an emphasis said function block in the structure relationship of said selected function block definition.

2. The display and edit device of claim 1 further comprising a display selector that selectively determines, when a command to switch display is received, whether a function block definition or a function block instance should be displayed, based on current display and current conditions of processing by said display and edit device and causes the determined display to be made.

3. The display and edit device of claim 1 wherein said block definition analyzer is for accessing said program stored in said program memory, analyzing algorism of function block definition which is detected in said program, carrying out a process of judging presence or absence of any function block definition that is being called in said algorism and, if a called function block definition is found to be present, connecting said called function block definition found to be present below an original function block definition, repeating said process until a function block definition not being called is reached to thereby analyze a connection relationship among function block definitions, and analyzing structure relationship of function block definitions contained in said program; and wherein said block instance analyzer is for accessing said program stored in said program memory, analyzing algorism of function block instance which is detected in said program, carrying out a process of judging presence or absence of any function block instance that is being called in said algorism and, if a called function block instance is found to be present, connecting said called function block instance found to be present below an original function block instance, repeating said process until a function block instance not being called is reached to thereby analyze a connection relationship among function block instances, and analyzing structure relationship of function block instances contained in said program; and a structure display device for causing to simultaneously display structure relationship of the analyzed structure relationship of said function block definition and structure relationship of the analyzed structure relationship of said function block instance.

4. The display and edit device of claim 1 wherein said program containing function blocks are hierarchically structured.

5. A method of displaying a program including function blocks for a display and edit device, said function blocks serving to use a language element referred to as function block definitions to establish input and output parameters, internal variables and operations algorisms of the function block and to create copies referred to as function block instances by instantiating said function block definitions when said function block is incorporated in a user program, said method comprising the steps of:

accessing said program stored in a program memory and analyzing structure relationship of function block definitions contained in said program;

accessing said program stored in said program memory and analyzing structure relationship of function block instances contained in said program;

displaying simultaneously the analyzed structure relationship of function block definitions and the analyzed structure relationship of function block instances on the same display screen;

causing an instance display device to display a selected function block definition or a selected function block instance together with said structure relationship of the analyzed structure relationship of said function block definition and said structure relationship of the analyzed structure relationship of said function block instance; and     causing a display judging device to cause said structure display device to display with an emphasis the structure relationship of said selected function block definition or selected function block instance or a corresponding portion of the structure relationship of the function block instance;

wherein, when a function block included in said selected function block instance displayed by said instance display device is selected, said display judging device causes said structure display device to display with an emphasis said function block in the structure relationship of said selected function block instance; and     wherein, when a function block included in said selected function block definition displayed by said instance display device is selected, said display judging device causes said structure display device to display with an emphasis said function block in the structure relationship of said selected function block definition.

6. The method of claim 5 wherein said program containing function blocks are hierarchically structured.

7. The method of claim 5 comprising the steps of:

accessing said program stored in a program memory, analyzing algorism of function block definition which is detected in said program, carrying out a process of judging presence or absence of any function block definition that is being called in said algorism and, if a called function block definition is found to be present, connecting said called function block definition found to be present below an original function block definition, repeating said process until a function block definition not being called is reached to thereby analyze a connection relationship among function block definitions, and analyzing structure relationship of function block definitions contained in said program; and     accessing said program, analyzing algorism of function block instance which is detected in said program, carrying out a process of judging presence or absence of any function block instance that is being called in said algorism and, if a called function block instance is found to be present, connecting said called function block instance found to be present below an original function block instance, repeating said process until a function block instance not being called is reached to thereby analyze a connection relationship among function block instances, and analyzing structure relationship of function block instances contained in said program.

8. A computer-readable recording medium embodying a program for displaying and editing a user program including function blocks by a display and edit device, said program comprising:

a first program portion for accessing a program containing function blocks and being stored in a program memory, said function blocks serving to use a language element referred to as function block definitions to establish input and output parameters, internal variables and operations algorisms of the function block and to create copies referred to as function block instances by instantiating said function block definitions when said function block is incorporated in a user program, said first program portion analyzing structure relationship of function block definitions contained in said program;

a second program portion for accessing said program stored in said program memory and analyzing structure relationship of function block instances contained in said program; and     a third program portion for displaying the analyzed structure relationship of function block definitions and the analyzed structure relationship of function block instances on the same display screen;

said program serving to cause an instance display device to display a selected function block definition or a selected function block instance together with said structure relationship of the analyzed structure relationship of said function block definition and said structure relationship of the analyzed structure relationship of said function block instance;

said program further serving to cause a display judging device to cause said structure display device to display with an emphasis the structure relationship of said selected function block definition or selected function block instance or a corresponding portion of the structure relationship of the function block instance;

wherein, when a function block included in said selected function block instance displayed by said instance display device is selected, said display judging device causes said structure display device to display with an emphasis said function block in the structure relationship of said selected function block instance; and     wherein, when a function block included in said selected function block definition displayed by said instance display device is selected, said display judging device causes said structure display device to display with an emphasis said function block in the structure relationship of said selected function block definition.

9. The computer-readable recording medium of claim 8 wherein said program containing function blocks are hierarchically structured.

\* \* \* \* \*